United States Patent [19]

Pickard et al.

[11] Patent Number: 4,730,713
[45] Date of Patent: Mar. 15, 1988

[54] VEHICLE PLATE CLUTCH

[75] Inventors: Juergen Pickard, Wernau; Helmut Sandner, Neuhausen; Reudiger Giesen, Althuette; Erwin Nussbaumer, Waiblingen, all of Fed. Rep. of Germany

[73] Assignee: Daimler-Benz Aktiengesellschaft, Stuttgart, Fed. Rep. of Germany

[21] Appl. No.: 906,909

[22] Filed: Sep. 15, 1986

[30] Foreign Application Priority Data

Sep. 13, 1985 [DE] Fed. Rep. of Germany ....... 3532759

[51] Int. Cl.$^4$ ........................................... F16D 25/063
[52] U.S. Cl. ................... 192/85 AA; 92/168; 92/248
[58] Field of Search ............ 192/85 R, 85 A, 85 AA, 192/87.11, 87.13, 87.14, 87.15; 92/168, 170, 248

[56] References Cited

U.S. PATENT DOCUMENTS

| | | | |
|---|---|---|---|
| 2,670,828 | 3/1954 | McFarland | 192/85 AA |
| 2,965,207 | 12/1960 | Snyder | 192/85 AA X |
| 3,996,817 | 12/1976 | Winzeler | 192/87.13 X |
| 4,271,951 | 6/1981 | Nishimura et al. | 192/85 AA X |
| 4,635,778 | 1/1987 | Lederman | 192/85 AA |

FOREIGN PATENT DOCUMENTS

| | | |
|---|---|---|
| 1630950 | 8/1975 | Fed. Rep. of Germany . |
| 3012791 | 8/1983 | Fed. Rep. of Germany . |
| 1371478 | 10/1974 | United Kingdom . |
| 1475141 | 6/1977 | United Kingdom . |
| 1519586 | 8/1978 | United Kingdom . |
| 2073340 | 10/1981 | United Kingdom . |

OTHER PUBLICATIONS

Automobil Techniscle Zeitschrift, 82 (1980), pp. 111–116.
Daimler Blueprint 126 270 5828 (admitted prior art, date unknown).

Primary Examiner—Leslie Braun
Assistant Examiner—Richard M. Lorence
Attorney, Agent, or Firm—Barnes & Thornburg

[57] ABSTRACT

In a plate clutch, an annular cylinder chamber with a moveable annular cylinder portion is located in a transition region between a radial flange and a cylindrical external plate carrier integral with the radial flange. The position of the annular cylinder portion is fixed in the radial and axial directions relative to the external plate carrier by the flange which fixes the annular cylinder in one axial direction of the clutch axis and by means of a circlip in the other axial direction of the clutch axis. In order to improve the sealing of the working pressure chamber enclosed by the annular cylinder portion, the annular cylinder is supported in the radial directions by means of a ring seal, so that it can move and be also elastically carried on the external plate carrier.

8 Claims, 2 Drawing Figures

VEHICLE PLATE CLUTCH

BACKGROUND OF THE INVENTION

The invention relates to the structure of a piston cylinder of a known plate clutch wherein the cylinder is constructed in at least two pieces, with an outer radial piece of the cylinder positionable with respect to an external plate carrier which plate carrier also fixedly supports the remaining piece(s) of the cylinder.

BACKGROUND INFORMATION

In a plate clutch for an automatic epicyclic change-speed gearbox (see multiplate clutch "K1" in FIGS. 6 and 7 Automobiltechnische Zeitschrift 82 (1980) 3 pages 111-116 as well as Daimler-Benz blueprint 126-270-58-28), the annular cylinder has an L-profile in cross-section with a radial arm parallel to a flange, these two parts being rigidly connected together by rivets with the consequence that the annular cylinder is immovably fixed relative to the external plate carrier. The annular cylinder encloses an annular piston engaging with a plate pack, which piston—together with the flange—encloses a working pressure chamber which can have applied to it the working pressure to which the annular piston is subjected by the changing and control device of the epicyclic change-speed gearbox. Because of the high loads, triggered by the pressure forces, on the external plate carrier—whose external periphery is also designed as the brake drum of a band brake and which is manufactured from a pressed sheet metal part—leaks can occur in the working pressure chamber due to greater or lesser elastic deformations of the partition sections.

In a known plate clutch of an epicyclic change-speed gearbox (German Pat. No. 3,012,791) of a different generic type for connecting the two central wheels of a single frame triple epicyclic gear, a cylindrical external plate carrier is provided with a recess for the location of a disk brake in the transition region to a radial flange. The internal plate carrier of this disk brake is formed integrally with the recess. A sleeve-shaped annular cylinder is inserted in the central opening of the flange and this, together with a cylindrical wall section of the recess, encloses a cylindrical space accepting an annular piston. The restraint between the annular cylinder and the flange is designed as a pressure resistant press fit for which no special seals are provided and which permits neither radial, nor axial, relative movements between the two parts.

In a known double plate clutch (German Ausleges-chrift No. 1,630,950) of still another different generic type, a cylindrical external plate carrier common to both clutches is provided with a radial flange on one of its ends. This flange becomes an intergral sleeve-shaped hub in the radially inwards direction. Two plate packs can be supported axially on a backing disk located between them and fixed so as not to move with the external plate carrier; the plate pack, located on the opposite side of the backing disk to the flange, can be engaged by means of a pressure disk which is connected to an annular piston by a traction cylinder, located concentrically to the external plate carrier; and the annular piston is located on the side of the flange opposite to the plate pack. This annular piston slides on an annular cylinder which is located in the transition region between the flange and the hub and is clamped by means of screws so that it cannot move relative to the flange. The supply of pressure medium takes place from the hub via the annular cylinder into the working pressure chamber enclosed by the annular piston and the flange. No special seals are provided between the annular cylinder and the flange or hub.

SUMMARY OF THE INVENTION

The object of which the invention is based consists essentially in improving the sealing of the working pressure chamber in a plate clutch for connecting gear elements of an epicyclic change-speed gearbox. An annular cylinder is located in a transition region between a radial flange and a cylindrical external plate carrier integral with the radial flange and with means for the radial and axial positional fixing of the annular cylinder relative to the external plate carrier. The flange fixes movement of the annular cylinder in one axial direction of the clutch and a circlip fixes the movement in the other axial direction. The annular cylinder is supported in the radial directions by means of a ring seal so that it can both move and be elastically supported on the external plate carrier.

In the plate clutch according to the invention, the annular cylinder is more or less free, to adjust itself relative to the external plate carrier under force influences. Therefore, internal forces on the cylinder are minimized so that, as a particular advantage, the use of plastic as the material for the annular cylinder is made possible. Additionally, the assemblage allows for substantial increases in the effective external diameter of the associated annular piston.

These and other objects, features, and advantages of the present invention will become more apparent from the following description when taken in connection with the accompanying drawings which show, for the purposes of illustration only, one embodiment in accordance with the present invention, and wherein:

DESCRIPTION OF PREFERRED EMBODIMENT

Figure 1:
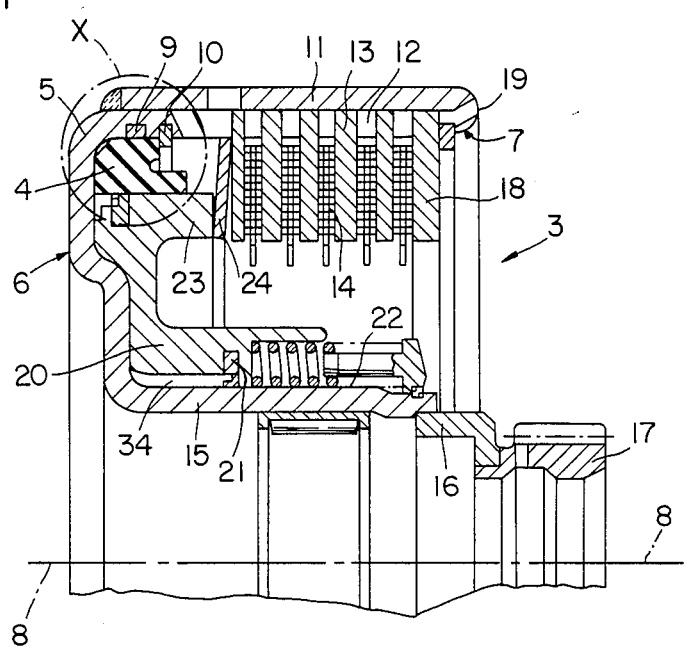
FIG. 1 shows an axial section through a plate clutch according to the invention, in which the internal plate carrier, which is not essential to the invention, is not shown.

Referring now to the drawings wherein like reference numerals are used to designate like parts and more particularly to FIG. 1.

A cylindrical external plate carrier 7 is made up of double-walled pressed sheet metal by folding over a wall section 11. On its radially inner wall section are axial grooves 12 for accepting external clutch plates 13 so that they are rotationally fixed, but can be axially displaced and these external plates 13 cooperate with internal plates 14 held between these external plates 13 in an appropriate manner on an internal plate carrier, not shown.

At one of its ends, the external plate carrier 7 has a radial flange 6 which, in turn, is formed integrally with a radially inner sleeve-shaped hub 15 which is in turn connected, via an intermediate ring 16, to an inner central wheel 17 of an epicyclic change-speed gearbox. The parts 6, 7, 11 and 15 are formed as integral pressed sheet metal parts.

The external and internal plates 13 and 14 are supported along the clutch axis 8—8 away from the flange 6, via a backing disk 18, by a circlip 19 inserted in a peripheral groove of the inner wall part of the external plate carrier 7.

In a transition region 5 between the flange 6 and the external plate carrier 7, there is cylinder portion 4 of the cylinder resting against the annular piston 20 and an annular working cylinder chamber 34 defined by hub 15, flange 6 on the outside and a cylinder portion 4 and piston 20 on the inside. An annular piston 20 operates in this chamber. This annular piston 20 is guided at its radially inward side by means of a piston seal 21 on a cylindrical surface 22 of the hub 15 so as to resist pressure and so that the piston 20 can be displaced. The annular piston 20 is formed integrally with a pressure ring portion 23 on its end facing towards the plates 13, 14. An unattached plate spring 24 is located between the pressure ring portion 23 and the plates 13, 14, wherein the piston acts through the spring 24 to force the plates together.

Figure 2:
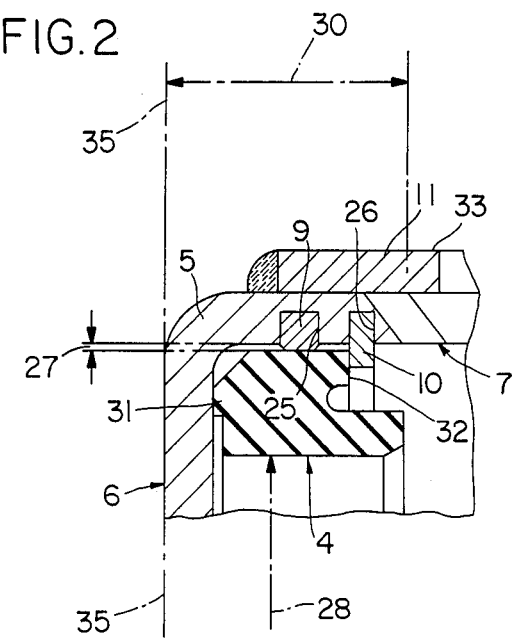
FIG. 2 shows the detail x of FIG. 1 on an enlarged scale.

The annular cylinder portion 4 (see FIG. 2) has an annular end seating area 31 by means of which it is in contact with the flange 6. In the axial direction of the clutch axis 8—8 opposite the seating area 31, the annular cylinder portion 4 is contacted by means of a further end seating portion 32 by a circlip 10, which is inserted in a peripheral groove 26 of the external plate carrier 7.

Relative to the external plate carrier 7, the annular cylinder portion 4 has a radial clearance 27. A ring seal 9 is inserted in a peripheral groove 25 of the external plate carrier 7 to provide a good seal for the working pressure chamber 34, enclosed by the annular cylinder portion 4 relative to the unmachined internal wall of the external plate carrier 7. This ring seal 9 also provides an elastic radial support for the annular cylinder portion 4. The annular cylinder portion 4 is therefore retained more or less force-free on the external plate carrier 7 and can therefore be made from a plastic material.

By means of the invention, the piston diameter 28 of the annular piston 20 can be very large with respect to prior art devices.

By means of the invention, the distance 30 between the first axial groove 12 and the outer radial plane 35 of the flange 6 can be very small in relation to the axial distance of the plates 13; 14, as opposed to the aforementioned "internal state of the art" assemblage, since the recess in the cylinder (between numerals 5 and 6) for the L-shaped leg of the internal state of the art piston portion can now house the piston 20 itself, thus reducing the distance 30 with a constant left to right thickness of the actuating portion of the piston 20. Thus in the same axial length, the right hand distance 30 is less than before, so that use of a large number of plates 13, 14 becomes possible.

The internal plate carrier, which holds the internal plates 14 of the plate clutch 3 can be connected in the normal fashion to a planet wheel carrier of a Ravigneaux gear, in which a gear wheel, as the smaller of two inner central wheels, engages directly with an auxiliary planet engaging with a main planet and the larger central wheel engages directly with the main planet.

It has been found advantageous to provide a clearance 27 between the external plate carrier 7 and the annular cylinder portion portion 4 of between 0.2 and 0.5 mm in the case of an external plate carrier 7 having an internal diameter of, for example, 137 mm. In order to achieve good centering of the annular cylinder portion 4 by means of the ring seal 9, it is particularly advantageous if the latter—in the unstressed condition (i.e. before the insertion of the annular cylinder portion 4), has a cross-section which is sufficiently large that—when in contact with the bottom of the groove 25—it protrudes radially inwards from the groove 25 by an excess dimension of between 0.6 and 1 mm.

While we have shown and described only one embodiment in accordance with the present invention, it is understood that the same is not limited thereto but is susceptible to numerous changes and modifications as known to one having ordinary skill in the art, and we therefore do not wish to be limited to the details shown and described herein, but intend to cover all such modifications as are encompassed by the scope of the appended claims.

What is claimed:

1. A plate clutch assembly comprising an annular cylinder chamber; an annular cylinder portion means mounted in a transition region of the annular cylinder chamber to define in part the annular cylinder chamber between a radial flange means of the annular cylinder chamber and cylindrical external clutch plate carrier means of the annular cylinder chamber; said cylindrical external clutch plate carrier means being integral with the radial flange means; means for axial positioning of the annular cylinder portion means relative to the external clutch plate carrier means including the radial flange means which prohibits movement of the annular cylinder portion in one axial direction of an axis of the clutch and a circlip prohibiting movement in an opposite axial direction of an axis of the clutch; and where the annular cylinder portion means is supported against movement in an outward radial direction from the axis of the clutch by means of an elastic ring seal so that the annular cylinder portion means can be elastically supported on the external clutch plate carrier of the annular cylindrical chamber.

2. A plate clutch assembly according to claim 1, characterised in that the annular cylinder portion means is plastic.

3. A plate clutch assembly according to claim 1, wherein a small clearance space is provided between an outer facing circumferential surface of the annular cylindrical portion means and an inwardly facing circumferential surface of the external clutch plate carrier means.

4. A plate clutch assembly according to claim 2, wherein a small clearance space is provided between an outer facing circumferential surface of the annular cylindrical portion means and an inwardly facing circumferential surface of the external clutch plate carrier means.

5. A plate clutch assembly according to claim 1, wherein the annular cylindrical portion means has a small axial length in comparison to an axial length of a plate portion of the clutch taken along the clutch axis.

6. A plate clutch assembly according to claim 2, wherein the annular cylindrical portion means has a small axial length in comparison to an axial length of a plate portion of the clutch taken along the clutch axis.

7. A plate clutch assembly according to claim 3, wherein the annular cylindrical portion means has a small axial length in comparison to an axial length of a plate portion of the clutch taken along the clutch axis.

8. A plate clutch assembly according to claim 4, wherein the annular cylindrical portion means has a small axial length in comparison to an axial length of a plate portion of the clutch taken along the clutch axis.

* * * * *